United States Patent
Amano et al.

(10) Patent No.: US 6,180,266 B1
(45) Date of Patent: Jan. 30, 2001

(54) CUTTING TOOL

(75) Inventors: Hirokuni Amano; Yuji Shimatani, both of Toyama; Kiyoshi Nakagawa, Toyamaken; Syunichi Asakura, Chiryu, all of (JP)

(73) Assignee: Nachi-Fujikoshi Corp, Toyama (JP)

(*) Notice: Under 35 U.S.C. 154(b), the term of this patent shall be extended for 0 days.

(21) Appl. No.: 09/353,636

(22) Filed: Jul. 15, 1999

(30) Foreign Application Priority Data

Jul. 15, 1998 (JP) .................................................. 10-199400
Jul. 15, 1998 (JP) .................................................. 10-199401

(51) Int. Cl.$^7$ ............................. B32B 15/00; C22B 9/18; B23P 15/28
(52) U.S. Cl. ......................... 428/681; 75/10.25; 148/321; 148/324; 148/333; 148/334; 148/442; 148/905; 407/119; 427/250; 428/636; 428/660; 428/908.8; 428/932; 428/938
(58) Field of Search ..................... 428/660, 681, 428/908.8, 932, 938; 420/10, 100, 101, 102, 104, 105, 107, 111, 114, 115, 122, 124, 127, 583, 590; 148/321, 324, 333, 334, 442, 905; 75/10.25, 239, 240, 241, 242; 407/119

(56) References Cited

U.S. PATENT DOCUMENTS 4,462,293 * 7/1984 Gunzner ................................ 407/118
5,252,119 10/1993 Nishida et al. ......................... 75/240
5,522,914 * 6/1996 Stasko et al. .......................... 75/231

* cited by examiner

Primary Examiner—Deborah Jones
Assistant Examiner—Robert R. Koehler
(74) Attorney, Agent, or Firm—Venable; Robert J. Frank; Leo J. Jennings

(57) ABSTRACT

A cutting tool having cutting edges made of a high speed tool steel exhibiting very high wear and anti-chipping resistances, and sufficient toughness is provided. The high speed tool steel consists essentially of by weight C:0.6 to 1.8%, Si:1.2% max, Mn:0.5% max, Cr:3.5 to 5.0%, Mo:10% max, W:21% max, V:2 to 4% and Co:7 to 10%, the balance being Fe and incidental impurities, and the steel of the cutting edge comprise MC-type carbide grains each having a maximum equal value diameter of a circle ranging substantially 5 to 14 μm, and the MC-type carbide grains having an equal value diameter of the circle ranging substantially 5 to 14 μm have a ratio between short and long diameters ranging over substantially 0.3.

10 Claims, 10 Drawing Sheets

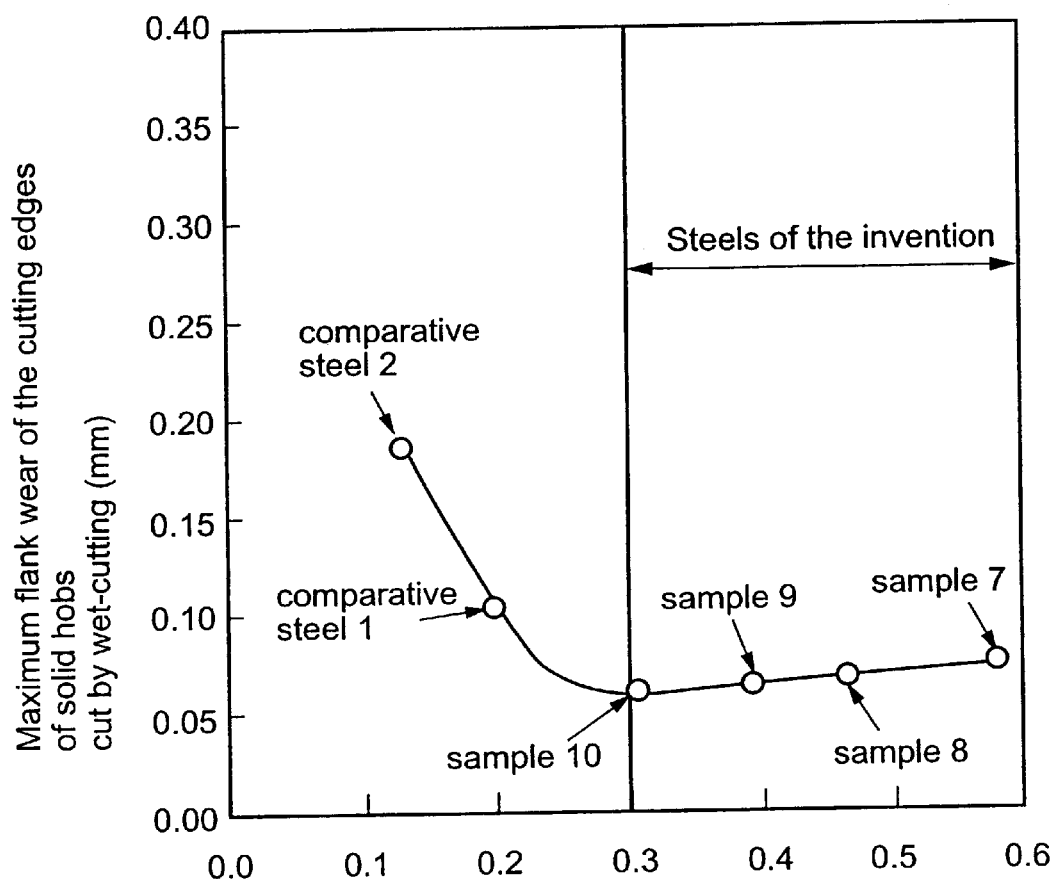

Ratios between short and long diameters of the cross sectional area of the MC-type carbide grains having an equal value diameter of circle ranging substantially 5~14 μm

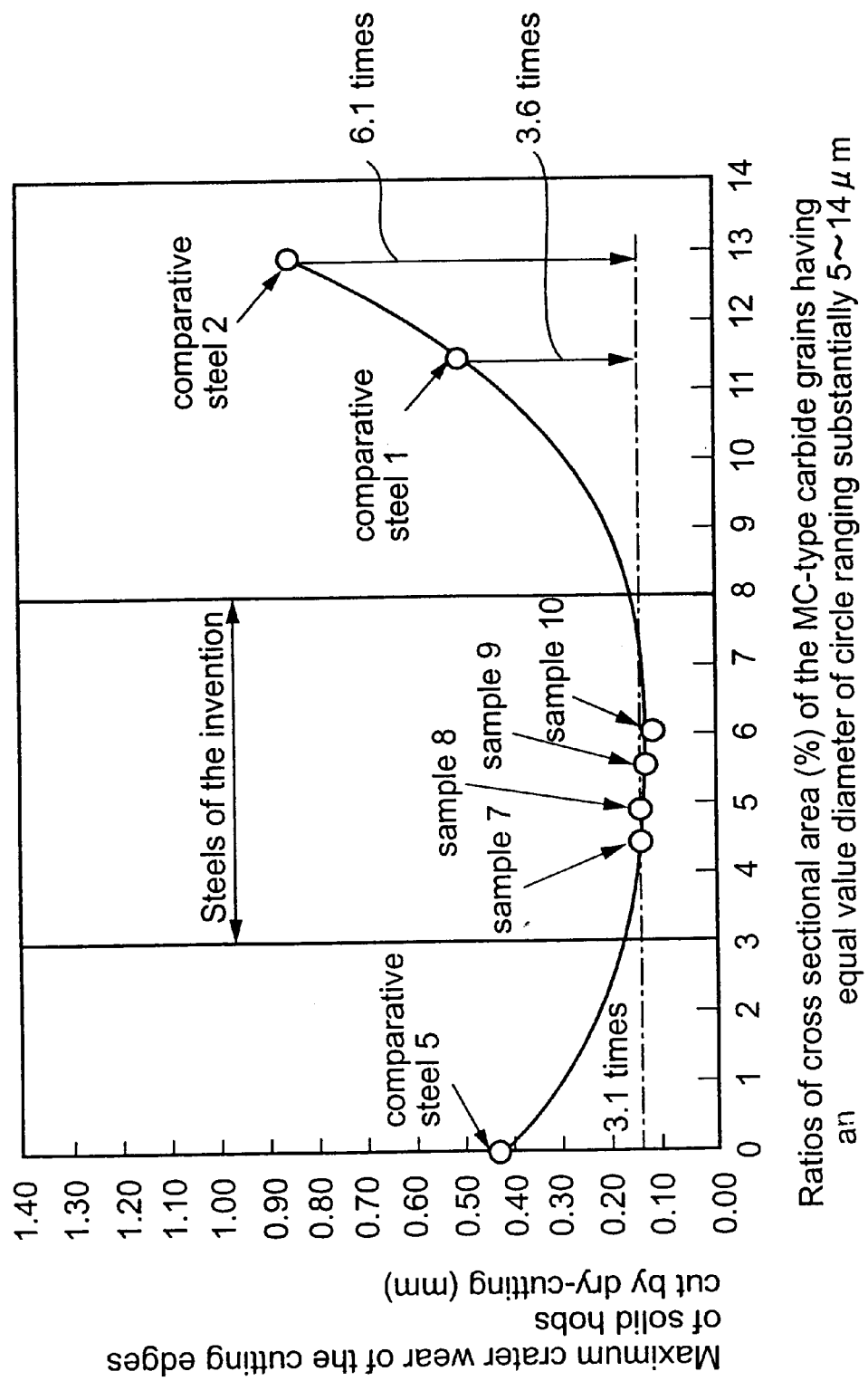

CUTTING TOOL

BACKGROUND OF THE INVENTION

1. Field of the Invention

The present invention relates to cutting tools such as hobbing cutters, end mills and so on having cutting edges made of high speed tool steels.

2. Description of the Related Art

High speed tool steels and cemented carbides are used as typical conventional cutting tool materials of cutting tools such as hobbing cutters, end mills and so on.

High speed tool steels for cutting tools containing more than 2% of Vanadium (V) are exploited as cutting tool materials having a high hardness, wear resistance and a high heat resistance.

Cemented carbides, on the other hand, are very hard and exhibit both excellent wear resistance and high heat resistance. However, because of the cemented carbides are frangible and of high material costs as well as high machining costs, and further, the cemented carbides have inferior in both grindability and anti-shock resistance compared with the high speed tool steels, the cemented carbides are not presently in wide practical use as cutting tool materials for reasons of a lack of credibility in quality and high material costs as well as high machining costs. Therefore most hobbing cutters which perform interrupted cuttings are made of high speed tool steels, and only small parts thereof are made of cemented carbides.

High speed tool steels for use for such cutting tools usually contain more than 2% of Vanadium (V) to enlarge the carbide grain size of hard MC-type carbide grains mainly consisting of Vanadium alloys. However, conventional high speed tool steels produced by melting which contain more than 3% of V, result that the more amount of V increase, the more become liable to generate crystallized coarse or elongated angled MC-type carbide grains, deteriorating both grindability as well as toughness, and become liable to cause a problem of a chipping or fracture of the tool cutting edge starting from one of the MC-type carbide grains.

Also, conventional high speed tool steels produced by sintering powder disclosed, for instance, in U.S. Pat. No. 5,252,119, are liable to generate too fine grain particles of MC-type carbides which result insufficient toughness causing a problem of quick or large wear of the cutting edge and shorten tool life despite of using high cost materials.

In wet-cutting of hobs using cutting oil, although the whole surfaces of the hob cutting edges are initially coated with Ti- or Ti-alloy ceramic coating films, after re-ground of the hob cutting edges are performed, the coating films deposited on the cutting faces, or rake faces, are removed away, and there are required both heat- and wear-resistances of the high speed tool steel materials themselves of the hobs.

On the other hand, in dry-cutting of hobs performed without the supply of cutting oil, the hob materials must have high hardness, sufficient toughness to resist shocks by interrupt cuttings of hobs and heat resistance. In addition, the surfaces of the cutting edges must deposit coating films having wear-, heat-, and acid-resistances as well as lubricative properties to prevent wear, chipping and fracture thereof. Further, the hob materials are required to have a good affinity with the above coating films.

SUMMARY OF THE INVENTION

An object of the present invention is to provide a cutting tool having a cutting edge made of a high speed tool steel having high a wear resistance, a sufficient toughness to resist a shock by interrupt cutting of the cutting tool and a heat resistance to prevent wear, chipping and fracture thereof.

Other object of the present invention is to provide a cutting tool having a cutting edge made of a high speed tool steel having a good affinity with the coating films.

Another object of the present invention is to provide a cutting tool which is adapted for both wet-cutting using cutting oil as well as dry-cutting performed without the supply of cutting oil.

These and other object are performed by providing a cutting tool having a cutting edge made of a high speed tool steel consisting essentially of by weight C:0.6 to 1.8%, Si:1.2% max, Mn:0.5% max, Cr:3.5 to 5.0%, Mo:10% max, W:21% max, V:2 to 4% and Co:4 to 9%; or alternately, V:4 to 6% and Co:7 to 10%; the balance being Fe and incidental impurities, and the steel of the cutting edge comprising MC-type carbide grains which mainly comprise vanadium carbide grains each having a maximum equal value diameter of a circle ranging substantially 5 to 14 μm, which equal value diameter of the circle being a diameter of any one of a circle being converted to the circle having the same cross sectional area as that of a cross sectional area of any one of the MC-type carbide grains, and the MC-type carbide grains having an equal value diameter of a circle ranging substantially 5 to 14 μm have a ratio between short and long diameters ranging over substantially 0.3, wherein the ratio between short and long diameters is a value obtained by dividing a short diameter of any one of the MC-type carbide grains by a long diameter of the same.

By such an arrangement of the present invention, the cutting tool having the cutting edge made of the high speed tool steel exhibits a very high wear resistance, sufficient toughness to resist the shock caused by interrupt cutting of the cutting tool and heat resistance thereby preventing wear, chipping and fracture thereof. Also, the cutting tool exhibits a very high heat resistance to withstand the heat generated in a dry cutting of steel materials performed without a supply of cutting oil which is expected an increasingly wide use hereafter.

Preferably, the MC-type carbide grains having an equal value diameter of a circle ranging substantially 5 to 14 μm have a ratio of cross sectional area ranging substantially 3 to 8%, wherein the ratio of cross sectional area is a ratio dividing a total sum of the cross sectional areas of the MC-type carbide grains by a total cross sectional plane area being cut away and measured along a plane substantially parallel to a forgoing or rolling axis of the steel.

Further preferably, a surface of the cutting edge has at least one or more of layer of Ti- and/or Ti-alloy coating film applied by PVD to more increase both wear and anti-chipping resistance.

More preferably, the high speed tool steel is produced by subjecting a repeated or doubled electro-slag melting process to adjust the grain size of the MC-type carbide grains under conditions; preventing an entry of $O_2$ and $N_2$ gases into melting steel, at melting speed: 400 to 800 kg/h, and keeping a ratio of a diameter of an ingot divided by an electrode diameter to be kept in a range of from 1.2 to 1.7.

As a result of applicants's actual experiences using cutting tools such as solid hobs and end mils both made of high speed tool steels, they recognized in order to obtain a high speed tool steel having high heat- and wear resistances, sufficient toughness to resist the shock caused by interrupt cutting of the cutting tools, and further, to prevent wear, chipping and fracture thereof, it is essential to restrict adequately a maximum equal value diameter of a circle of the MC-type carbide grains so that the grains have a maximum equal value diameter of a circle ranging substantially 5 to 14 μm, and further to restrict a ratio between short and long diameters which is a value obtained by dividing a short diameter of any one of the MC-type carbide grains by a long diameter of the same as large as possible so that each MC-type carbide grain having an equal value diameter of a circle ranging substantially 5 to 14 μm has a near spherical shape.

Also, it is essential to restrict adequately a ratio of total sum of the cross sectional areas of MC-type carbide grains having an equal value diameter of a circle ranging substantially 5 to 14 μm with respect to a total cross sectional plane area being cut away and measured along a plane substantially parallel to a forgoing or rolling axis of the steel. These are reasons applicants proposed restriction of elements of the present invention.

The plane substantially parallel to a forgoing or rolling axis of the high speed tool steel is, for instance, in case of round bars or square bars of high speed tool steels, a plane cut away in an axial or longitudinal direction of the round or square bars. And when measuring by microscope, the total sum of cross sectional areas will be computed by summing each area of the MC-type carbide grains having an equal value diameter of a circle ranging substantially 5 to 14 μm appeared on the screen of the microscope, and the total cross sectional plane area will be the total area of the screen.

Further, applicants recognized that the high speed tool steel is required to have a good affinity with the above coating films of the Ti- and/or Ti-alloy applied by PVD. And applicants recognized that the cutting edge made of the high speed tool steel coated with this film further improved to prevent chipping and to increase both heat and wear resistance.

Also applicants recognized that the cutting tool is preferably for use for a dry cutting of steel materials typically by a hobbing cutter performed without a supply of cutting oil.

The followings are reasons the applicants restricted parameters or chemical compositions of this invention. A cutting edge made of a high speed tool steel comprising MC-type carbide fine grains having the maximum equal value diameter of a circle less than 5 μm, is liable to causes the MC-type carbides to be removed together with the base materials through wear by adhesion or wear by oxidation, resulting that the cutting edge causes large or quick wear and shorten its service life.

A cutting edge made of a high speed tool steel comprising MC-type carbide fine grains having an equal value diameter of a circle more than 14 μm, or similarly that of the grains having a value obtained by dividing a short diameter of any one of the MC-type carbide grains by a long diameter of the same ranging less than substantially 0.3 become liable to generate crystallized coarse or elongated angled MC-type carbide grains, deteriorating both grindability as well as toughness, and become liable to cause a problem of a chipping or fracture of the tool cutting edge.

Also, the MC-type carbide grains having an equal value diameter of a circle ranging substantially 5 to 14 μm having a ratio of cross sectional area ranging more than 8%, is very frangible and become liable to cause a problem of a chipping or fracture of the tool cutting edge starting from one of the MC-type carbide grains. On the other hand, if the ratio of cross sectional area ranges less than 3%, the cutting edge is liable to cause a large or quick wear and shorten its service life.

C constitutes to improve wear resistance by forming MC-type carbides. However, if the quantity of C is too large, it causes toughness to deteriorated. Therefore, the quantity of C is adjusted to be in a range of from 0.6 to 1.8%.

Si and Mn are added as deoxidizers, however, in case the quantity of Si and Mn are too large, they also cause toughness to deteriorated. Therefore, each of the quantity of Si and Mn is adjusted to Si:1.2% max and Mn:0.5% max.

Cr is added by a quantity of from 3.5 to 5.0% to improve hardenability. If is smaller than 3.5%, the above shown effect is reduced. If is larger than 5.0%, it causes overall toughness to be deteriorated.

Mo:10% max and W:21% max are added to improve wear resistance by forming $M_6C$-type carbides. However, if the quantity of Mo or W is too large, it causes the toughness to deteriorated.

V also is able is improve wear resistance and to enlarge grain size of hard MC-type carbide grains. If it is too smaller, this effect is reduced. If it is too larger, it causes overall toughness to be deteriorated. Further, Co exhibits to improve resistance to softening on tempering. If it is too smaller, this effect is reduced. If is too larger, it causes overall toughness to be deteriorated. Therefore, in the first aspect of this invention, V and Co are adjusted to be a combination of V:2 to 4% and Co:7 to 10% in contrast, in the second aspect of this invention, V and Co are adjusted to be that of V:4 to 6% and Co:4 to 9%.

BRIEF DESCRIPTION OF THE DRAWINGS

FIG. 2A is a graph similar to FIG. 1A illustrating the example test results performed in the first Example of this invention showing the relationship between the amount of the maximum flank wear of the cutting edges of solid hobs being cut by wet-cutting which are respectively made of the sample steels 7 to 10 and the comparative steels 1 and 2 exhibited on Table 1, and the ratios between short and long diameters of the cross sectional area of the MC-type carbide grains having an equal value diameter of a circle ranging substantially 5 to 14 μm.

FIG. 3B is a graph similarly showing the relationship between the amount of the maximum crater wear of the same cutting edges of solid hobs being cut by dry-cutting used in FIG. 3A and the ratios(%) of the same.

DETAILED DESCRIPTION OF THE PREFERRED EMBODIMENTS

Figure 1A:
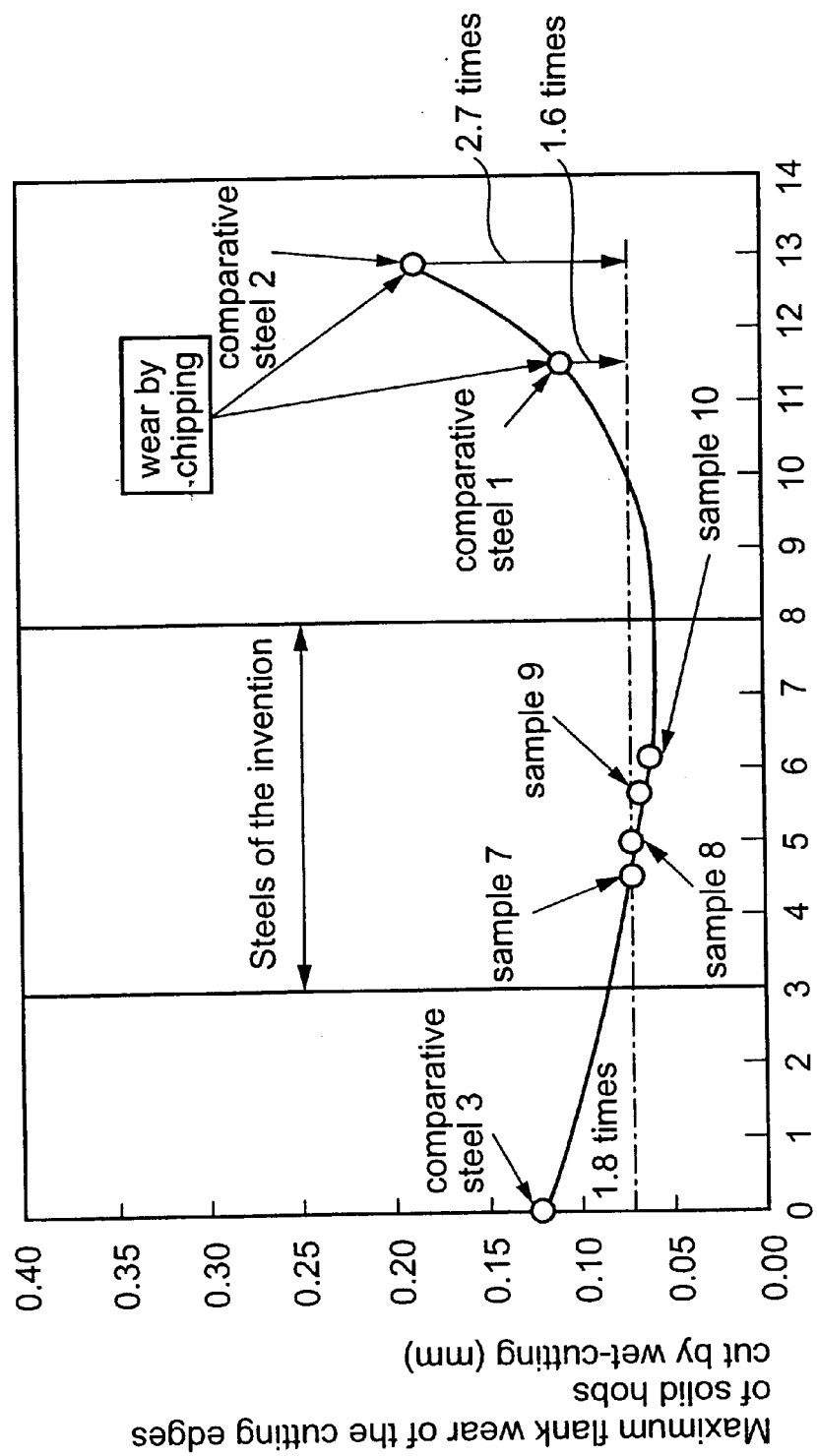
FIG. 1A is a graph illustrating the example test results performed in the first Example of this invention showing the relationship between the amount of the maximum flank wear of the cutting edges of solid hobs being cut by wet-cutting which are respectively made of the sample steels of the invention 7 to 10 and the comparative steels 1 to 3 exhibited on Table 1, and the ratios (%) of cross sectional area of the MC-type carbide grains having an equal value diameter of a circle ranging substantially 5 to 14 μm.

Table 1 shows the chemical composition by weight % of six kinds of experimental Comparative steels 1 to 6 and those of four kinds of experimental sample steels of the present invention 7 to 10. Materials of the high speed tool steels of the present invention are respectively produced by subjecting a repeated or doubled electro-slag melting process to adjust the grain size of the MC-type carbide grains under conditions; preventing an entry of $O_2$ and $N_2$ gases into melting steel, at melting speed: 400 to 800 kg/h, and keeping a ratio of a diameter of an ingot divided by an electrode diameter to be ranging from 1.2 to 1.7. Then, each materials was forged or rolled into round bars. The experimental Comparative steels 1 to 6 and experimental sample steels 7 to 10 of the present invention are respectively machined into solid hobs and roughing end mills according to Examples 1 to 3.

Table 1 also shows the ratios(%) of the cross sectional area(ROCSA) of the MC-type carbide grains having an equal value diameter of a circle ranging substantially 5 to 14 μm. The equal value diameter of the circle is a diameter of any one of a circle being converted to the circle having the same cross sectional area as that of a cross sectional area of any one of the MC-type carbide grains, and the ratios (%) of the cross sectional area is a ratio dividing a total sum of the cross sectional areas of the MC-type carbide grains having an equal value diameter of a circle ranging substantially 5 to 14 μm by a total cross sectional plane area being cut away and measured along a plane substantially parallel to a forgoing or rolling axis of the steel, while the ratio between short and long diameters is a value obtained by dividing a short diameter of any one of the MC-type carbide grains by a long diameter of the same.

In this Examples, the total sum of the cross sectional areas were measured by a measuring microscope by summing each area of the MC-type carbide grains having an equal value diameter of a circle ranging substantially 5 to 14 μm appeared on the screen of the measuring microscope, and the total cross sectional plane area was measured by the total area of the screen itself. And, the ratios(%) of the cross sectional area (RBSL) of the MC-type carbide grains having the maximum equal value diameter of a circle ranging substantially 5 to 14 μm were computer by dividing the total sum of each area of the MC-type carbide grains by the total area of the screen itself.

While the ratio between short and long diameters of the cross sectional area of the MC-type carbide grains is a value obtained by dividing a short diameter of any one of the same MC-type carbide grains having an equal value diameter of a circle ranging substantially 5 to 14 μm by a long diameter of the same grains appeared on the screen.

TABLE 1

| Nos. of steels | Chemical Composition (by weight %) | | | | | | | | MC-type carbide grains | | |
|---|---|---|---|---|---|---|---|---|---|---|---|
| | C | Si | Mn | Cr | W | Mo | V | Co | MEVD μm | ROCSA (%) | RBSL |
| Comparative(by melt) steel 1 | 1.06 | 0.32 | 0.23 | 3.90 | 5.73 | 5.68 | 2.35 | 4.67 | 17.8 | 11.7 | 0.23 |
| Comparative(by melt) steel 2 | 1.35 | 0.33 | 0.24 | 4.01 | 5.97 | 5.49 | 3.08 | 7.99 | 23.4 | 13.3 | 0.13 |
| Comparative(by PM) steel 3 | 1.33 | 0.52 | 0.29 | 3.98 | 6.37 | 5.04 | 2.98 | 7.94 | 2.6 | 0.0 | — |
| Comparative(by PM) steel 4 | 1.66 | 0.27 | 0.32 | 4.39 | 12.24 | 0.14 | 4.65 | 5.02 | 2.8 | 0.0 | — |
| Comparative(by PM) steel 5 | 2.22 | 0.37 | 0.30 | 3.99 | 13.98 | 8.03 | 6.03 | 10.14 | 3.0 | 0.0 | — |
| Comparative(by PM) steel 6 | 2.11 | 0.30 | 0.27 | 4.00 | 14.12 | 5.96 | 5.89 | 11.09 | 3.0 | 0.0 | — |

TABLE 1-continued

| Nos. of steels | Chemical Composition (by weight %) | | | | | | | | MC-type carbide grains | | RBSL |
|---|---|---|---|---|---|---|---|---|---|---|---|
| | C | Si | Mn | Cr | W | Mo | V | Co | MEVD μm | ROCSA (%) | |
| Steel of the Invention | | | | | | | | | | | |
| sample 7 | 1.26 | 0.40 | 0.27 | 3.98 | 6.12 | 5.39 | 2.64 | 7.51 | 8.6 | 4.6 | 0.58 |
| sample 8 | 1.39 | 0.37 | 0.31 | 4.00 | 6.34 | 5.41 | 3.46 | 9.18 | 10.1 | 5.0 | 0.47 |
| sample 9 | 1.55 | 0.41 | 0.25 | 3.99 | 12.19 | 0.23 | 4.38 | 4.82 | 11.7 | 5.7 | 0.39 |
| sample 10 | 1.75 | 0.39 | 0.26 | 4.04 | 12.09 | 0.32 | 5.55 | 8.46 | 13.0 | 6.1 | 0.31 |

Note:
MEVD means "a maximum equal value diameter of a circle".
PM means by Powdered Metallurgy produced by sintering powder.

Table 2 shows the results of the experimental tests performed according to Examples 1 to 3. In the Examples 1 and 2, the amount of the maximum flank wear and those of the crater wear of the solid hobs being cut both by wet-cutting (Example 1) and by dry-cutting (Example 2) are exhibited respectively, whereas in Example 3, the amount of the maximum width of flank wear of the cutting edges of roughing end mills being cut by dry-cutting are exhibited.

TABLE 2

| Nos. of steels | Example 1 wet-cutting by hobs maximum wear(mm) of | | Example 2 dry-cutting by hobs maximum wear(mm) of | | Example 3 dry-cutting by roughing end mills maximum width of flank wear(mm) |
|---|---|---|---|---|---|
| | flank | crater | flank | crater | |
| Comparative steels | | | | | |
| steel 1 | 0.11 | 0.131 | 0.254 | 0.518 | 0.075 |
| steel 2 | 0.185 | 0.191 | 0.414 | 0.872 | 0.147 |
| steel 3 | 0.121 | 0.115 | — | — | 0.067 |
| steel 4 | — | — | — | — | 0.064 |
| steel 5 | — | — | 0.270 | 0.441 | — |
| steel 6 | — | — | — | — | 0.035 |
| Steel of the Invention | | | | | |
| sample 7 | 0.075 | 0.090 | 0.150 | 0.158 | 0.018 |
| sample 8 | 0.069 | 0.086 | 0.146 | 0.144 | 0.016 |
| sample 9 | 0.067 | 0.084 | 0.141 | 0.137 | 0.016 |
| sample 10 | 0.067 | 0.079 | 0.135 | 0.128 | 0.013 |

EXAMPLE 1

In the first Example, solid hobs respectively made of the sample steels of the present invention 7 to 10 and the comparative steels 1 to 3 all shown in the Table 1 were subjected to cutting tests being cut by wet-cutting for a comparison test under the following conditions:
  specifications of solid hobs; the outer diameter φ; 70 mm the number of starts; 1
  coating; the cutting edges are coated with Ti-alloy coating films, however, the coating films on the flanks were previously removed
  works; made of JIS S45C (Hardness: HB175)
  cutting speed; 115 m/min cut depth; 6.75 mm
  feed per revolution; 3.14 mm/rev total cutting length; 25 m The test results obtained according to the Example 1 are shown in Table 2 (left column) and more clearly in FIGS. 1 and 2. FIG. 1A shows the relationship between the amount of the maximum flank wear of the cutting edges of the solid hobs being cut by wet-cutting and the ratios (%) of the cross sectional area of the MC-type carbide grains having an equal value diameter of a circle ranging substantially 5 to 14 μm. The coating films on the flanks of the solid hobs cut by wet-cutting were previously removed in order to keep the same test cutting condition as those of having no coating films on the flanks.

From FIG. 1A, the U-shaped curved line traced by points showing each amount of the maximum flank wear of the cutting edges of the solid hobs shows the bottom thereof at the points around the ratio 6% and exhibits stable small maximum flank wear around those of the points at between the ratios from 3 to 8%. The solid hobs made of the sample steels of the present invention 7 to 10 each exhibits far smaller maximum flank wear around the bottom portion of the curve around those of the points at between ratios from 4.6 to 6.1%. Contrary to these, the solid hobs made of the comparative steels 1 to 3 exhibit excessively greater maximum flank wear of the amount of about 1.6 times, 2.7 times and 1.8 times respectively compared with, for instance, that of the sample steel 8. It is further observed that most of the maximum flank wears of those of the comparative steels 1 and 2 are caused by the wear by chipping at the flanks of the cutting edges.

Figure 1B:
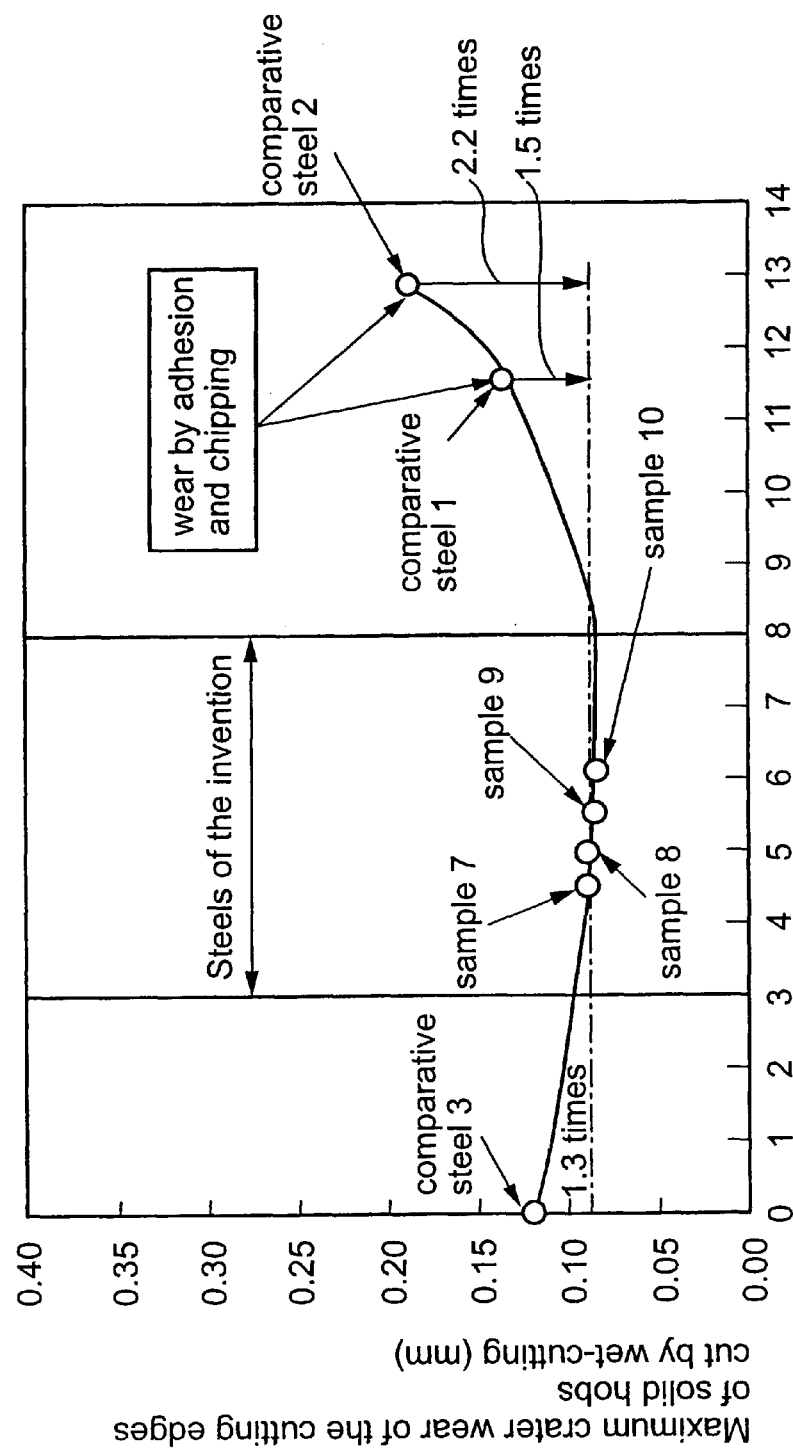
FIG. 1B is a graph similarly showing the relationship between the amount of the maximum crater wear of the same cutting edges of solid hobs used in FIG. 1A and the ratios (%) of the same.

FIG. 1B similarly shows the relationship between the amount of the maximum crater wear of the same cutting edges of the solid hobs as used in FIG. 1A and the ratios (%) of the same. Also from FIG. 1B, the U-shaped curved line traced by points showing each amount of the maximum flank wear of the cutting edges of the solid hobs shows the bottom thereof at the points around the ratio 6% and exhibits stable small maximum flank wear around those of the points at between ratios from 3 to 8%. The solid hobs made of the sample steels of the present invention 7 to 10 each exhibits far smaller maximum flank wear around the bottom portion of the curve around those of the points at between ratios from 4.6 to 6.1%. Contrary to these, the solid hobs made of the comparative steels 1 to 3 exhibit excessively greater maximum flank wear of the amount of about 1.3 times, 2.2 times and 1.5 times respectively compared with, for instance, that of the sample steel 8. It is further observed that most of the maximum flank wears of those of the comparative steels 1 and 2 are caused by the wear by adhesion coming from the lack of heat-resistance and the wear by chipping at the flanks of the cutting edges.

Figure 2B:
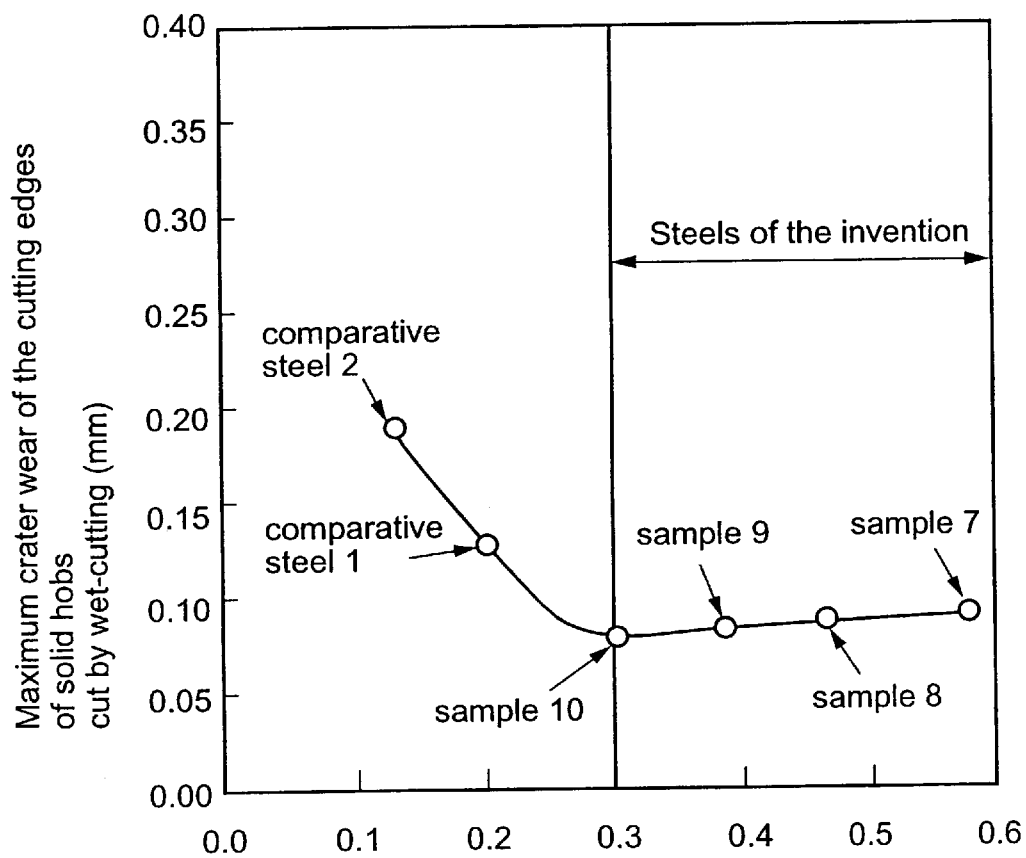
FIG. 2B is a graph similarly showing the relationship between the amount of the maximum crater wear of the same cutting edges of solid hobs being cut by wet-cutting used in FIG. 2A and the ratios of the same.

FIGS. 2A and 2B show the similar test results obtained by the first Example of this invention. FIG. 2A is a graph similar to FIG. 1A illustrating the relationship between the amount of the maximum flank wear of the cutting edges of the solid hobs being cut by wet-cutting which are respectively made of the sample steels 7 to 10 and the comparative steels 1 and 2 exhibited on Table 1, and the ratios between short and long diameters of the cross sectional area of the MC-type carbide grains having an equal value diameter of a circle ranging substantially 5 to 14 $\mu$m. The coating films on the flanks of the solid hobs cut by wet-cutting were previously removed in order to keep the same test cutting condition as those of having no coating films on the flanks.

From FIG. 2A, the similar U-shaped curved line as explained in FIG. 1A, each amount of the maximum flank wear of the cutting edges of the solid hobs cut by wet-cutting respectively made of the sample steels 7 to 10 exhibits a stable small maximum flank wear around those of the points at the ratios over 0.3 compared with those of the comparative steels 1 and 2.

FIG. 2B is a graph similarly showing the relationship between the amount of the maximum crater wear of the same cutting edges of solid hobs being cut by wet-cutting used in FIG. 2A and the ratios of the same. Also in FIG. 2B, the U-shaped curved line made of each sample steels 7 to 10 exhibits similarly as the amount of the maximum flank wear of FIG. 2A, a stable small maximum flank wear around those of the points at the ratios over 0.3 compared with those of the comparative steels 1 and 2.

EXAMPLE 2

Figure 3A:
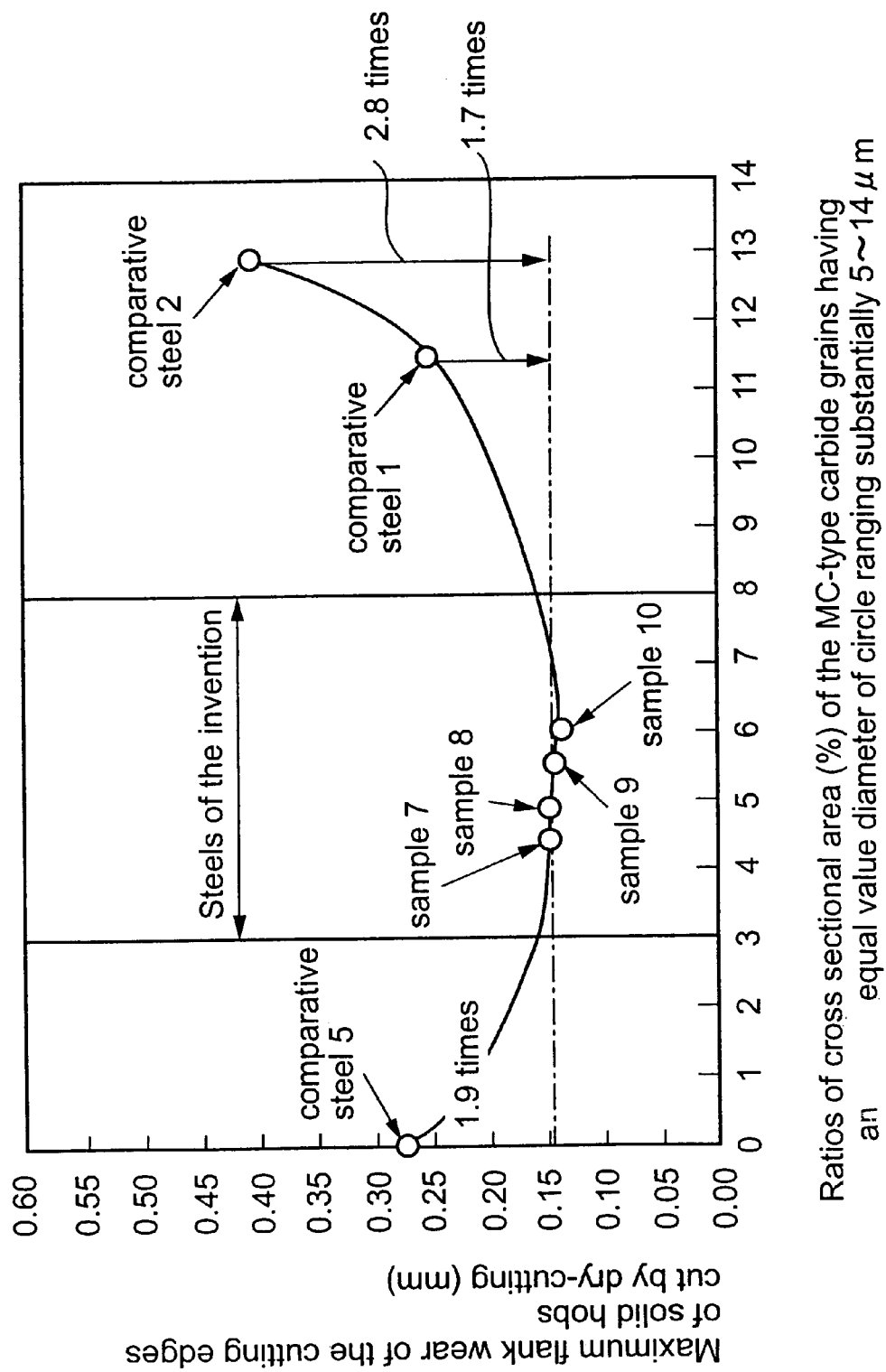
FIG. 3A is a graph illustrating the example test results performed in the second Example of this invention showing the relationship between the amount of the maximum flank wear of the cutting edges of solid hobs being cut by dry-cutting which are respectively made of the sample steels 7 to 10 and the comparative steels 1, 2 and 5 exhibited on Table 1, and the ratios(%) of cross sectional area of the MC-type carbide grains having an equal value diameter of a circle ranging substantially 5 to 14 μm.

In the second Example, solid hobs respectively made of the sample steels of the present invention 7 to 10 and the comparative steels 1, 2 and 5 all shown in the Table 1 were respectively machined, heat-treated and ground, and then each cutting edges were applied with compound Ti-alloy multi-films through PVD. These solid hobs were subjected to cutting tests being cut by dry-cutting for a comparison test under the following conditions:

specifications of solid hobs; the outer diameter $\phi$; 75 mm
number of starts; 4
coating; the cutting edges are coated with compound Ti-alloy multi-coating films, however the coating films on the flanks were previously removed works; made of JIS SCr420 (Hardness: HB180)
cutting speed; 200 m/min cut depth; 4.05 mm
feed per revolution; 2.5 mm/rev total cutting length; 250 m The test results obtained by the Example 2 are shown in Table 2 (center column) and more clearly in FIGS. 3 and 4. FIG. 3A shows the relationship between the amount of the maximum flank wear of the cutting edges of the solid hobs being cut by dry-cutting and the ratios (%) of the cross sectional area of the MC-type carbide grains having an equal value diameter of a circle ranging substantially 5 to 14 $\mu$m. The coating films on the flanks of the solid hobs had been previously removed in order to keep the same test cutting condition as those of having no coating films on the flanks.

From FIG. 3A, the U-shaped curved line traced by points showing each amount of the maximum flank wear of the cutting edges of the solid hobs also shows the bottom thereof at those points around the ratio 6% and exhibits stable small maximum flank wear around those of the points at between ratios from 3 to 8%. The solid hobs made of the sample steels of the present invention 7 to 10 each exhibits far smaller maximum flank wear around the bottom portion of the curved around the points at between ratios from 4.6 to 6.1%. Contrary to these, the solid hobs made of the comparative steels 1, 2 and 5 exhibit excessively greater maximum flank wear of the amount of about 1.7 times, 2.8 times and 1.9 times respectively compared with, for instance, that of the sample steel 8. It is further observed that in this Example 2 being cut by dry-cutting indicates far better results compared with those shown in the Example 1 being cut by wet-cutting which are exhibited in FIG. 1A.

FIG. 3B similarly shows the relationship between the amount of the maximum crater wear of the same cutting edges of the solid hobs as used in FIG. 3A and the ratios (%) of the same. Also from FIG. 3B, the U-shaped curved line traced by points showing each amount of the maximum flank wear of the cutting edges of the solid hobs shows the bottom thereof at the points around the ratio 6% and exhibits stable small maximum flank wear around those of the points at between the ratios from 3 to 8%. The solid hobs made of the sample steels of the present invention 7 to 10 each exhibits far smaller maximum flank wear around the bottom portion of the curve at the points between ratios 4.6 to 6.1%. Contrary to these, the solid hobs made of the comparative steels 1, 2 and 5 exhibit excessively greater maximum flank wear of the amount of about 3.6 times, 6.1 times and 3.1 times respectively compared with, for instance, that of the sample steel 8. Further, it is observed that in this Example 2 being cut by dry-cutting indicates far better results compared with those of in the Example 1 being cut by wet-cutting shown in the FIG. 1B.

Figure 4A:
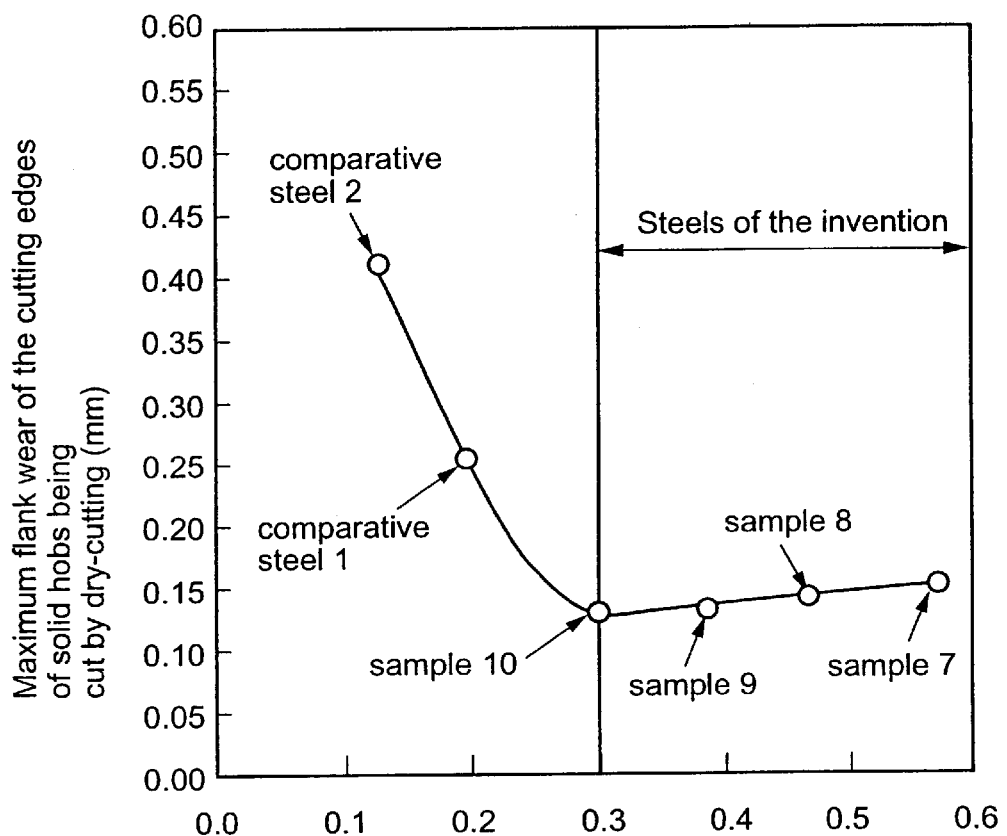
FIG. 4A is a graph similar to FIG. 3A illustrating the example test results performed in the second Example of this invention showing the relationship between the amount of the maximum flank wear of the cutting edges of solid hobs being cut by dry-cutting which are respectively made of the sample steels 7 to 10 and the comparative steels 1 and 2 exhibited on Table 1, and the ratios between short and long diameters of the cross sectional area of the MC-type carbide grains having an equal value diameter of a circle ranging substantially 5 to 14 μm.
Figure 4B:
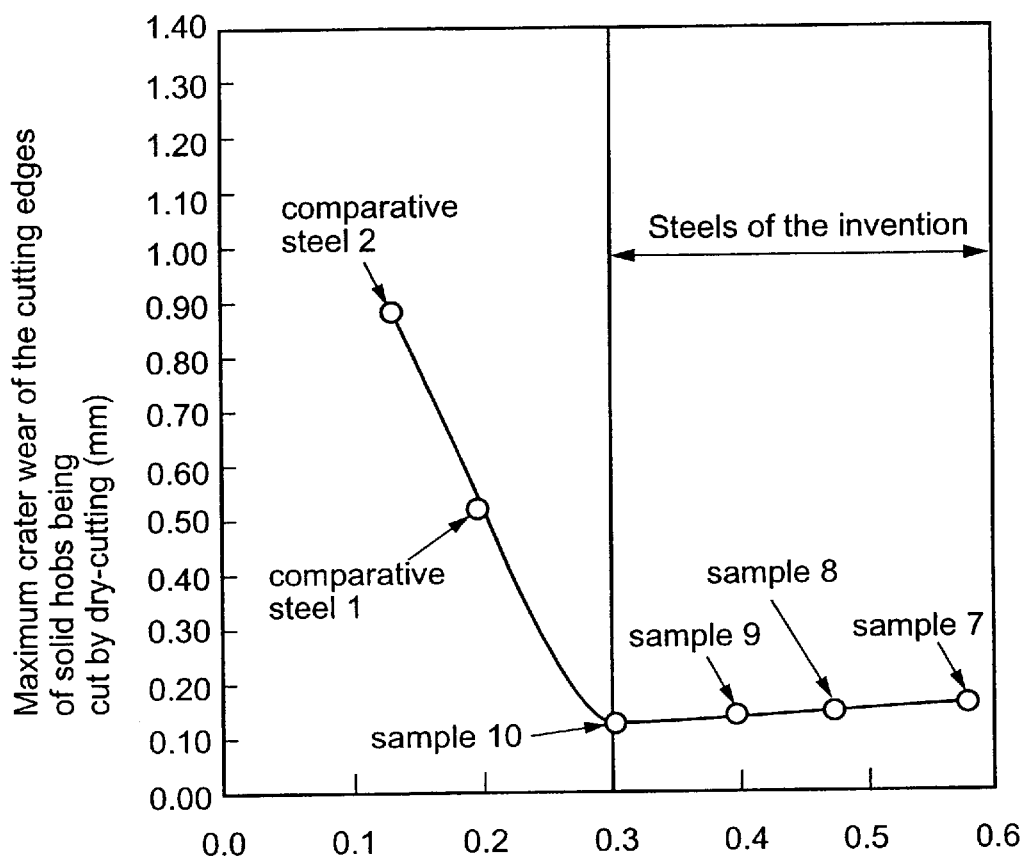
FIG. 4B is a graph similarly showing the relationship between the amount of the maximum crater wear of the same cutting edges of solid hobs as used in FIG. 4A and the ratios of the same.

FIGS. 4A and 4B show the similar test results obtained by the Example 2. FIG. 4A is a graph similar to FIG. 2A illustrating the relationship between the amount of the maximum flank wear of the cutting edges of solid hobs being cut by dry-cutting which are respectively made of the sample steels 7 to 10 and the comparative steels 1 and 2, and the ratios between short and long diameters of the cross sectional area of the MC-type carbide grains having an equal value diameter of a circle ranging substantially 5 to 14 $\mu$m. From FIG. 4A, each amount of the maximum flank wear of the cutting edges of the solid hobs made of the sample steels 7 to 10 exhibits a stable small maximum flank wear around those of the points at the ratios over 0.3 compared with those of the comparative steels 1 and 2.

FIG. 4B is a graph similarly showing the relationship between the amount of the maximum crater wear of the same cutting edges of the solid hobs being cut by dry-cutting used in FIG. 4A and the ratios of the same. Also in FIG. 4B, each amount of the maximum crater wear of those of the sample steels 7 to 10 exhibits similarly a stable small maximum flank wear around those of the points at the ratios over 0.3 compared with those of the comparative steels 1 and 2.

EXAMPLE 3

Figure 5:
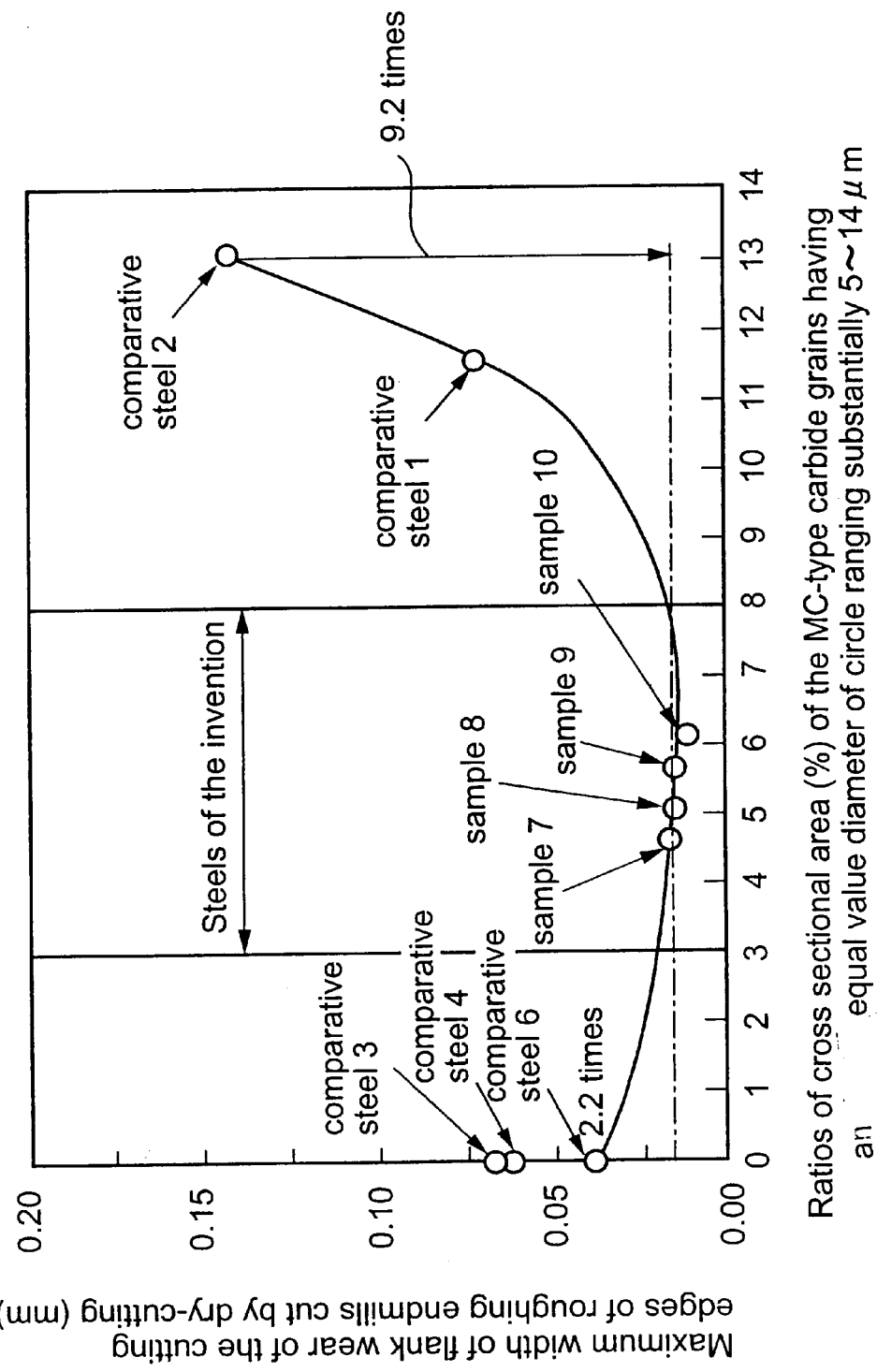
FIG. 5 is a graph illustrating the example test results performed in the third Example of this invention showing the relationship between the amount of the maximum width of flank wear of the cutting edges of roughing end mills being cut by dry-cutting which are respectively made of the sample steels 7 to 10 and the comparative steels 1 to 4 and 6 exhibited on Table 1, and the ratios (%) of the cross sectional area of the MC-type carbide grains having an equal value diameter of a circle ranging substantially 5 to 14 μm.
Figure 6:
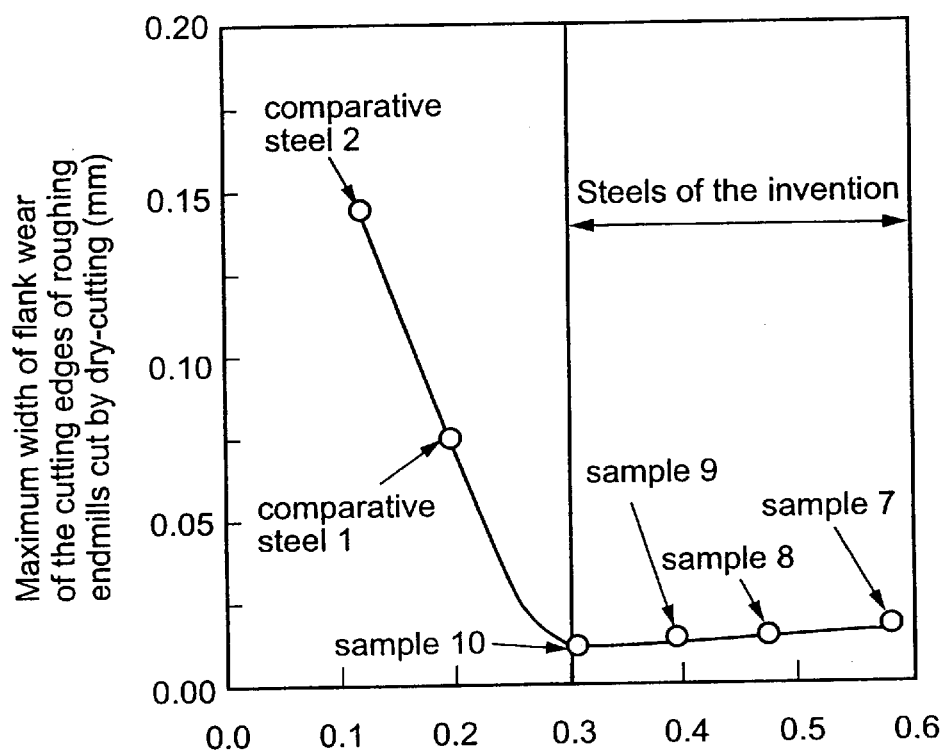
FIG. 6 is a graph similar to FIG. 5 illustrating the example test results performed in the third Example of this invention showing the relationship between the amount of the maximum width of flank wear of the cutting edges of roughing end mills being cut by dry-cutting which are respectively made of the sample steels 7 to 10 and the comparative steels 1 to 4 and 6 exhibited on Table 1, and the ratios between short and long diameters of the cross sectional area of the MC-type carbide grains having an equal value diameter of a circle ranging substantially 5 to 14 μm.

In the third Example, roughing end mills respectively made of the sample steels of the present invention 7 to 10 and the comparative steels 1 to 4 and 6 all shown in the Table 1 were subjected to cutting tests being cut by dry-cutting for a comparison test under the following conditions; and each maximum width of flank wear of the cutting edges were measured;

specifications of roughing end mills; the outer diameter φ; 20 mm coating; the cutting edges are coated with compound Ti-alloy multi-coating films, however, the coating films on the flanks were previously removed works; made of JIS S50C (Hardness: HB180)

cutting speed; 60 m/min feed per revolution; 0.067 mm/cutting edge total cutting length; 6 m The test results obtained by the Example 3 are shown in Table 2 (right column) and more clearly in FIGS. 5 and 6. FIG. 5 shows the relationship between the amount of the maximum width of flank wear of the cutting edges of the roughing end mills being cut by dry-cutting which are respectively made of the sample steels 7 to 10 and the comparative steels 1 to 4 and 6 exhibited on Table 1, and the ratios (%) of the cross sectional area of the MC-type carbide grains having an equal value diameter of a circle ranging substantially 5 to 14 μm. The test was performed with the coating films on the cutting edges.

From the FIG. 5, the U-shaped curved line traced by points showing each amount of the maximum width of flank wear of the cutting edges of the roughing end mills shows the bottom thereof at the points around the ratio 6% and exhibits stable small maximum flank wear those of the points at between the ratios from 3 to 8%. The roughing end mills made of the sample steels of the present invention 7 to 10 each exhibits far smaller maximum width of flank wear around the bottom portion of the curve around the points between ratios from 4.6 to 6.1%. Contrary to these, the roughing end mills made of the comparative steels 1 to 4 and 6 exhibit excessively greater maximum flank wear of the amount of about 9.2 times (comparative steel 2 produced by melting) and 2.2 times (comparative steel 6 produced by sintering powder) respectively compared with, for instance, that of the sample steel 8.

FIG. 6 similarly shows the relationship between the amount of the maximum width of the same cutting edges of the roughing end mills used in FIG. 1A and the ratios between short and long diameters of the cross sectional area of the MC-type carbide grains having an equal value diameter of a circle ranging substantially 5 to 14 μm. Also from FIG. 6, each amount of the maximum width of flank wear of the cutting edges of the roughing end mills respectively made of the sample steels 7 to 10 exhibits a stable small maximum flank wear around those of the points at between the ratios over 0.3 compared with those of the comparative steels 1 and 2.

What is claimed is:

1. A cutting tool having a cutting edge made of a high speed tool steel consisting essentially of by weight C:0.6 to 1.8%, Si:1.2% max, Mn:0.5% max, Cr:3.5 to 5.0%, Mo:10% max, W:21% max, V:2 to 4% and Co:7 to 10%, the balance being Fe and incidental impurities, and the steel of the cutting edge comprising MC carbide grains each having a maximum equal value diameter of a circle ranging substantially 5 to 14 μm, which equal value diameter of the circle being a diameter of any one of a circle being converted to the circle having the same cross sectional area as that of a cross sectional area of any one of the MC carbide grains, and the MC carbide grains having an equal value diameter of a circle ranging substantially 5 to 14 μm have a ratio between short and long diameters ranging over substantially 0.3, wherein the ratio between short and long diameters is a value obtained by dividing a short diameter of any one of the MC carbide grains by a long diameter of the same.

2. The cutting tool of claim 1, wherein the MC carbide grains having the equal value diameter of the circle ranging substantially 5 to 14 μm have a ratio(%) of cross sectional area ranging substantially 3 to 8%, in which the ratio of cross sectional area is a ratio dividing a total sum of the cross sectional areas of the MC carbide grains by a total cross sectional plane area being cut away and measured along a plane substantially parallel to a forgoing or rolling axis of the steel.

3. The cutting tool of claim 2, wherein at least a surface of the cutting edge has at least one layer of Ti- and/or Ti-alloy coating film applied by PVD.

4. The cutting tool of claim 2, wherein the cutting tool is for use for a dry cutting of steel materials performed without a supply for cutting oil.

5. The cutting tool of claim 2, wherein the high speed tool steel is produced by subjecting a repeated or doubled electro-slag melting process to adjust a carbide grain size of the MC carbide grains under conditions; preventing an entry of $O_2$ and $N_2$ gases into melting steel, at melting speed: 400 to 800 kg/h, and keeping a ratio of a diameter of an ingot divided by an electrode diameter to be in a range of from 1.2 to 1.7.

6. A cutting tool having a cutting edge made of a high speed tool steel consisting essentially of by weight C:0.6 to 1.8%, Si:1.2% max, Mn:0.5% max, Cr:3.5 to 5.0%, Mo:10% max, W:21% max, V:4 to 6% and Co:4 to 9%, the balance being Fe and incidental impurities, and the steel of the cutting edge comprising MC carbide grains each having a maximum equal value diameter of a circle ranging substantially 5 to 14 μm, which equal value diameter of the circle being a diameter of any one of a circle being converted to the circle having the same cross sectional area as that of a cross sectional area of any one of the MC carbide grains, and the MC carbide grains having an equal value diameter of a circle ranging substantially 5 to 14 μm have a ratio between short and long diameters ranging over substantially 0.3, wherein the ratio between short and long diameters is a value obtained by dividing a short diameter of any one of the MC carbide grains by a long diameter of the same.

7. The cutting tool of claim 6, wherein the MC carbide grains having the equal value diameter of the circle ranging substantially 5 to 14 μm have a ratio(%) of cross sectional area ranging substantially 3 to 8%, in which the ratio of cross sectional area is a ratio dividing a total sum of the cross sectional areas of the MC carbide grains by a total cross sectional plane area being cut away and measured along a plane substantially parallel to a forging or rolling axis of the steel.

8. The cutting tool of claim 7, wherein at least a surface of the cutting edge has at least one layer of Ti- and/or Ti-alloy coating film applied by PVD.

9. The cutting tool of claim 7, wherein the cutting tool is for use for a dry cutting of steel materials performed without a supply of cutting oil.

10. The cutting tool of claim 7, wherein the high speed tool steel is produced by subjecting a repeated or doubled electro-slag melting process to adjust a carbide grain size of the MC carbide grains under condition; preventing an entry of $O_2$ and $N_2$ gases into melting steel, at melting speed: 400 to 800 kg/h, and keeping a ratio of a diameter of an ingot divided by an electrode diameter to be in a range of from 1.2 to 1.7.

* * * * *